(12) United States Patent
Irish et al.

(10) Patent No.: US 7,917,700 B2
(45) Date of Patent: Mar. 29, 2011

(54) METHOD AND CACHE CONTROL CIRCUIT FOR REPLACING CACHE LINES USING ALTERNATE PLRU ALGORITHM AND VICTIM CACHE COHERENCY STATE

(75) Inventors: John David Irish, Rochester, MN (US); Chad B. McBride, Rochester, MN (US); Jack Chris Randolph, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 11/924,163

(22) Filed: Oct. 25, 2007

(65) Prior Publication Data

US 2009/0113134 A1    Apr. 30, 2009

(51) Int. Cl.
*G06F 12/12* (2006.01)
(52) U.S. Cl. ........................... 711/136; 711/134
(58) Field of Classification Search .................. 711/134, 711/136
See application file for complete search history.

(56) References Cited

U.S. PATENT DOCUMENTS

| | | |
|---|---|---|
| 5,594,886 A | 1/1997 | Smith et al. |
| 6,185,658 B1 | 2/2001 | Arimilli et al. |
| 6,279,086 B1 | 8/2001 | Arimilli et al. |
| 6,282,617 B1 | 8/2001 | Tirumala et al. |
| 6,601,144 B1 | 7/2003 | Arimilli et al. |
| 6,629,210 B1 | 9/2003 | Arimilli et al. |
| 6,662,173 B1 | 12/2003 | Hammarlund et al. |
| 6,857,048 B2 | 2/2005 | Rankin et al. |
| 6,993,628 B2 | 1/2006 | Starke |

*Primary Examiner* — Sanjiv Shah
*Assistant Examiner* — Midys Rojas
(74) *Attorney, Agent, or Firm* — Joan Pennington

(57) ABSTRACT

A method and a cache control circuit for replacing a cache line using an alternate pseudo least-recently-used (PLRU) algorithm with a victim cache coherency state, and a design structure on which the subject cache control circuit resides are provided. When a requirement for replacement in a congruence class is identified, a first PLRU cache line for replacement and an alternate PLRU cache line for replacement in the congruence class are calculated. When the first PLRU cache line for replacement is in the victim cache coherency state, the alternate PLRU cache line is picked for use.

16 Claims, 9 Drawing Sheets

METHOD AND CACHE CONTROL CIRCUIT FOR REPLACING CACHE LINES USING ALTERNATE PLRU ALGORITHM AND VICTIM CACHE COHERENCY STATE

FIELD OF THE INVENTION

The present invention relates generally to the data processing field, and more particularly, relates to a method and cache control circuit for replacing a cache line using an alternate pseudo least-recently-used (PLRU) algorithm with a victim cache coherency state, and a design structure on which the subject circuit resides.

DESCRIPTION OF THE RELATED ART

Computers have become increasingly faster and one of the ways in which to increase the speed of computers is to minimize storage access time. In order to reduce data access time, special purpose high-speed memories called caches are used to temporarily store data, which are currently in use. For example, a processor cache typically is positioned near or integral with the processor. Data stored in the cache advantageously may be accessed by the processor, for example, in only one processor cycle retrieving the data necessary to continue processing; rather than having to stall and wait for the retrieval of data from a secondary slower memory or main memory.

Multiprocessing computer systems include multiple processors, each processor employed to perform computing tasks. A particular computing task may be performed upon one processor while other processors perform other unrelated computing tasks. Alternatively, components of a particular computing task are distributed among the multiple processors to decrease the time required to perform the computing task as a whole. One commercially available Multiprocessing computer system is a symmetric multiprocessor (SMP) system. An SMP computer system typically includes multiple processors connected through a cache hierarchy to a shared bus. A memory connected to the shared bus is shared among the processors in the system.

Many computer systems have two levels of caching referred to as L1 and L2 caches above main memory. The units of transfer between the L1 and L2 caches, and between the L2 cache and main memory are referred to as cache lines. Today, typical computer systems have a fixed line size, usually with the same line size for the L1 and L2 caches. Hardware associated with caches used to track cache lines includes cache directories, snoop filters, and remote directories. Caches have multiple ways of associativity and information typically stored in cache directories include tag information, or a portion of the address of the cache line; a state field, such as Invalid, Shared, SharedLast, Modified, Tagged, and Exclusive states typically used in cache management.

Typically an existing cache line replacement algorithm, such as a least-recently used (LRU) algorithm or a pseudo least-recently-used (PLRU) algorithm, is used to replace or discard a selected cache line to allow another cache line space for storage within the cache.

SUMMARY OF THE INVENTION

A principal aspect of the present invention is to provide a method and a cache control circuit for replacing a cache line using an alternate pseudo least-recently-used (PLRU) algorithm with a victim cache coherency state. Other important aspects of the present invention are to provide such method and cache coherency control circuit substantially without negative effect and that overcome many of the disadvantages of prior art arrangements.

In brief, a method and a cache control circuit are provided for replacing a cache line using an alternate pseudo least-recently-used (PLRU) algorithm with a victim cache coherency state, and a design structure on which the subject cache control circuit resides. When a requirement for replacement in a congruence class is identified, a first PLRU cache line for replacement and an alternate PLRU cache line for replacement in the congruence class are calculated. When the first PLRU cache line for replacement is in the victim cache coherency state, the alternate PLRU cache line is picked for replacement.

The victim cache coherency state is a new cache coherency state used to manage a cache line that is currently in use by a read claim engine or a snoop engine. The victim cache coherency state cannot be modified or used until released by the owner of the victim state, when the owner has completed the desired tack, such as castout, fill or read. The victim cache coherency state was added to ensure that hit checking logic, the read claim engine, and the snoop engine do not collide on the same cache line. The alternate PLRU cache line, which is a next best PLRU cache line, is provided for replacement by the read claim unit when the calculated first PLRU is in the victim cache coherency state. The alternate PLRU cache line is then used as the selected cache line to castout or discard.

In accordance with features of the invention, the alternate PLRU is formed by first calculating the current PLRU, then picking a next best sibling of the current PLRU in a binary tree having the next most arrows pointing to the sibling. In the case of a 7 bit binary tree, there are 3 next-best siblings to choose from. The choice of the next best sibling is based on the probability that the next hit will change the desirability of the way as the next best PLRU. This is enabled because the binary tree is only updated on cache hits and when a cache hit occurs then only certain bits of the binary tree are updated to specific values based on the way of the cache hit.

In accordance with features of the invention, using the alternative PLRU allows the read claim unit to continue working on a fetch without having to wait for the selected replacement state to be taken out of victim cache coherency state. This improves the performance of cache misses and requires little added logic.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, a victim cache coherency state is a new cache coherency state used to manage a cache line that is currently in use by a read claim engine or a snoop engine. The victim cache coherency state cannot be modified or used until released by the owner of the victim state, when the owner has completed the desired tack, such as castout, fill or read. The victim cache coherency state was added to ensure that hit checking logic, the read claim engine, and the snoop engine do not collide on the same cache line.

In accordance with features of the invention, an alternate pseudo least-recently-used (PLRU) cache line is picked to castout or discard when the read claim engine wants to replace a cache line in a full congruence class and that cache line is in a victim cache coherency state. Improved performance of cache coherency operations is enabled with the alternate PLRU in accordance with the preferred embodiment effectively without degrading the hit rate performance of the L2 cache and without requirement of broadcasting the in-flight command list to all bus units for tag comparison.

In accordance with features of the invention, an alternate pseudo least recently used (PLRU) algorithm of the present invention preserves the most recently used (MRU) and offers an alternative PLRU or next best PLRU to the read claim unit in cases where the calculated PLRU is in a victim state and read claim wants to age it out. A significant advantage of using an alternate PLRU is that the read claim unit is enabled to continue working on a fetch without having to wait for the selected cache state to be taken out of victim cache coherency state. This improves the performance of cache misses at the expense of very little additional logic.

Figure 1:
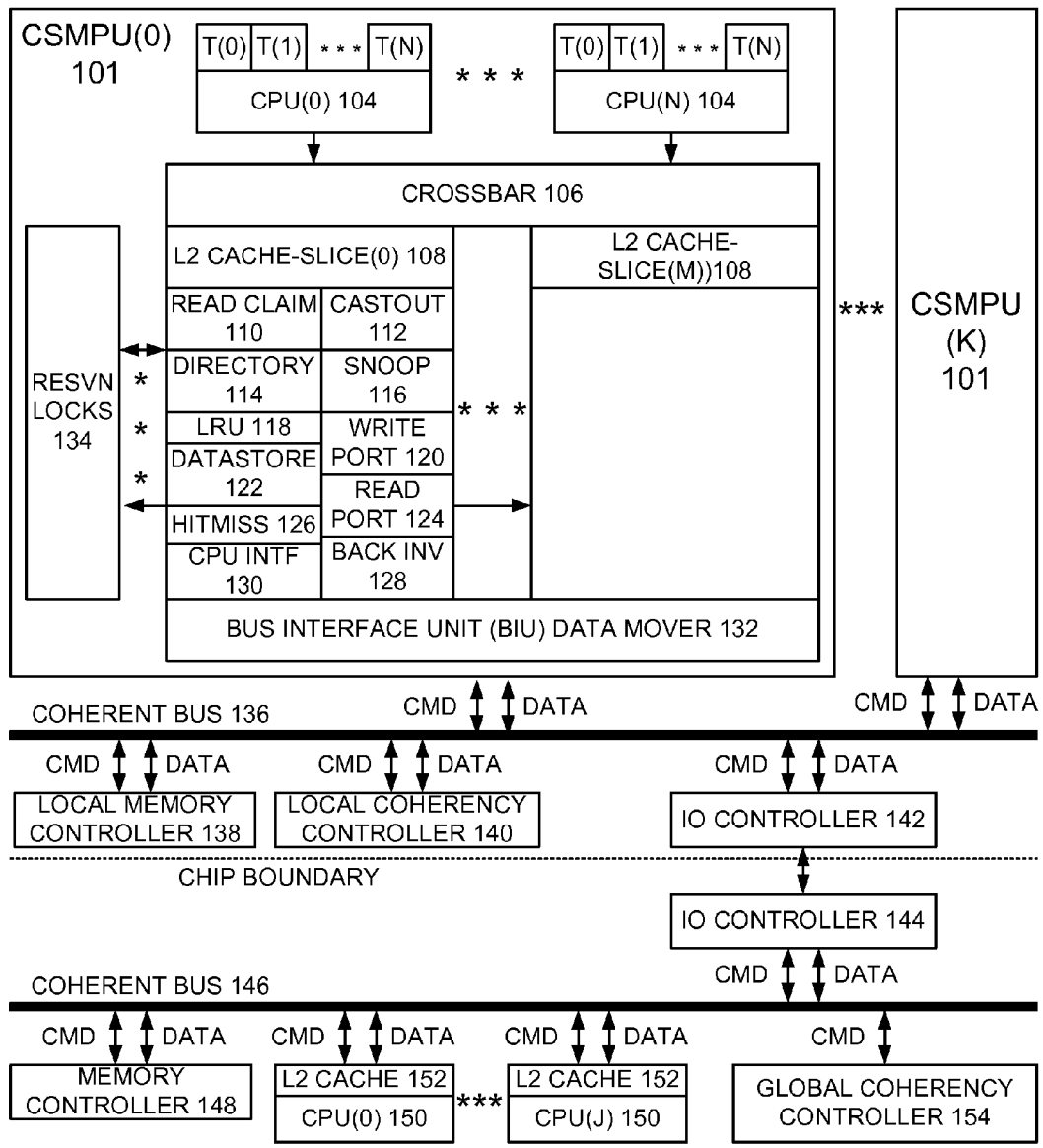
FIG. 1 is a block diagram representation of an exemplary computer system for implementing cache coherency with an alternate least recently used (LRU) algorithm in accordance with the preferred embodiment.

Having reference now to the drawings, in FIG. 1, there is shown an exemplary computer system generally designated by the reference character 100 for replacing a cache line using an alternate pseudo least recently used (PLRU) algorithm in accordance with the preferred embodiment. Computer system 100 includes a plurality of coherency state multiprocessing units (CSMPUs) 0-K, 101. As shown, CSMPU 101 includes a plurality of central processor units (CPUs) 0-N, 104 coupled via a crossbar unit 106 to a plurality of shared L2 cache memory slices 0-M, 108. Each of the CPUs 0-N, 104 includes a plurality of history fields T0-TN. Cache slice fetching logic includes a read claim unit 110, a castout unit 112, a directory 114, a snoop unit 116, a least recently used (LRU) 118, a write port 120, a data store 122, a read port 124, a hitmiss 126, a back Inv 128, and a CPU interface 130.

CSMPUs) 0-K, 101 are connected via an arbitrary interconnection network or a shared coherent bus 136 to a shared main memory (not shown), a local memory controller 138, a local coherency controller 140, and input/output (IO) controller 142. As shown, the on-chip IO controller 142 is connected to an off chip IO controller 144 and connected via a second shared coherent bus 146 to a memory controller 148, a plurality of CPUs 0-J, 150, each with a respective second L2 cache 152, and a global coherency controller 154.

It should be understood that the present invention is not limited to use with the illustrated cache coherent multiprocessor computer system 100 of FIG. 1. Computer system 100 is shown as an example sufficient for understanding the invention.

In accordance with features of the invention, an enhanced method and cache control circuit are provided for replacing a cache line using an alternate pseudo least recently used (LRU) algorithm for a shared L2 cache, such as shared L2 cache memory slices 0-M, 108. For example, the cache design supports up to 128 congruence classes and 8 ways of associativity and is shared by multiple general purpose processing elements (GPEs), such as CPUs 0-N, 104. Cache line coherency, to memory and other units, is maintained through a coherent bus, such as coherent bus 136, and coherent bus 146, and global/local coherency controllers or address concentrators, such as local coherency controller 140, and global coherency controller 154. The cache design supports the following cache coherency states including Invalid, Shared, SharedLast, Modified, Tagged, Exclusive, and the Victim cache coherency state (CCS) used to protect cache lines during castouts, pushes and fills. The enhanced method and cache control circuit of the invention provides an improvement on the PLRU algorithm for use with the victim CCS.

Figure 2A:
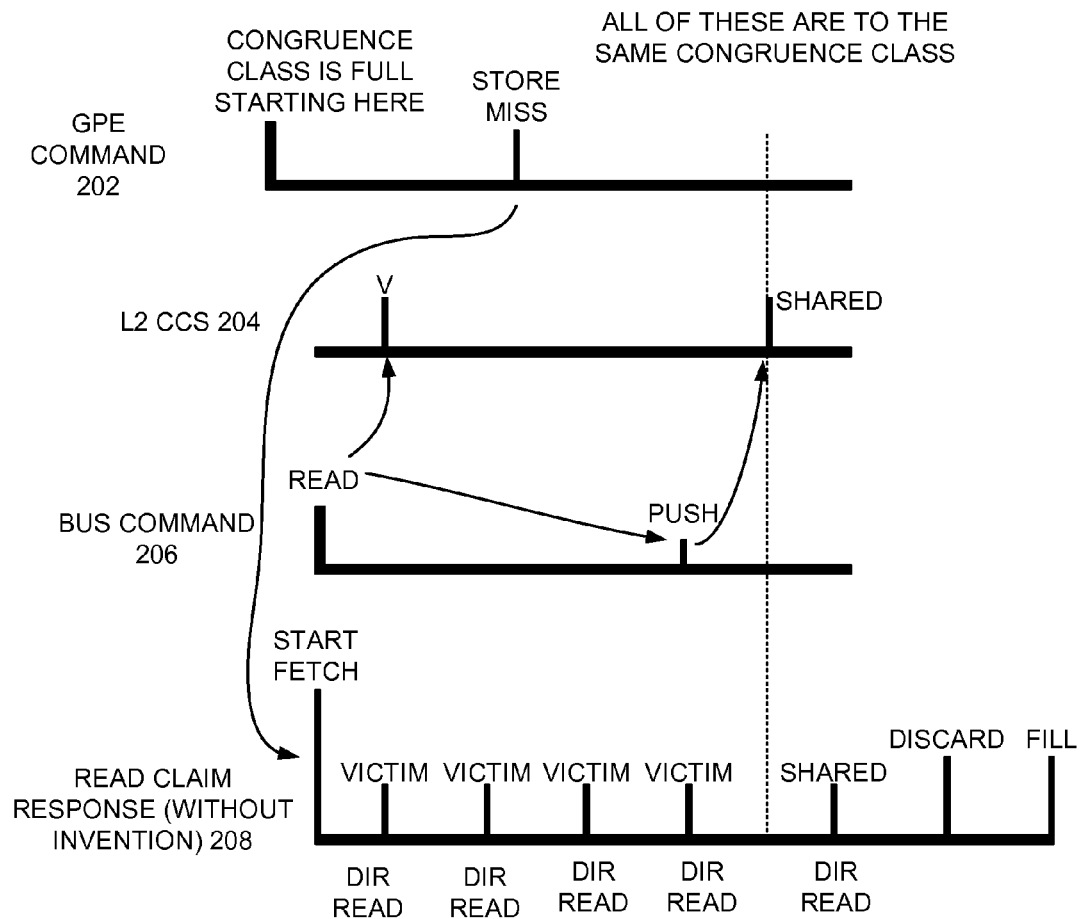
FIGS. 2A and 2B are diagrams respectively illustrating performance problems of conventional cache coherency operations and improved performance of cache coherency operations in accordance with the preferred embodiment.
Figure 2B:
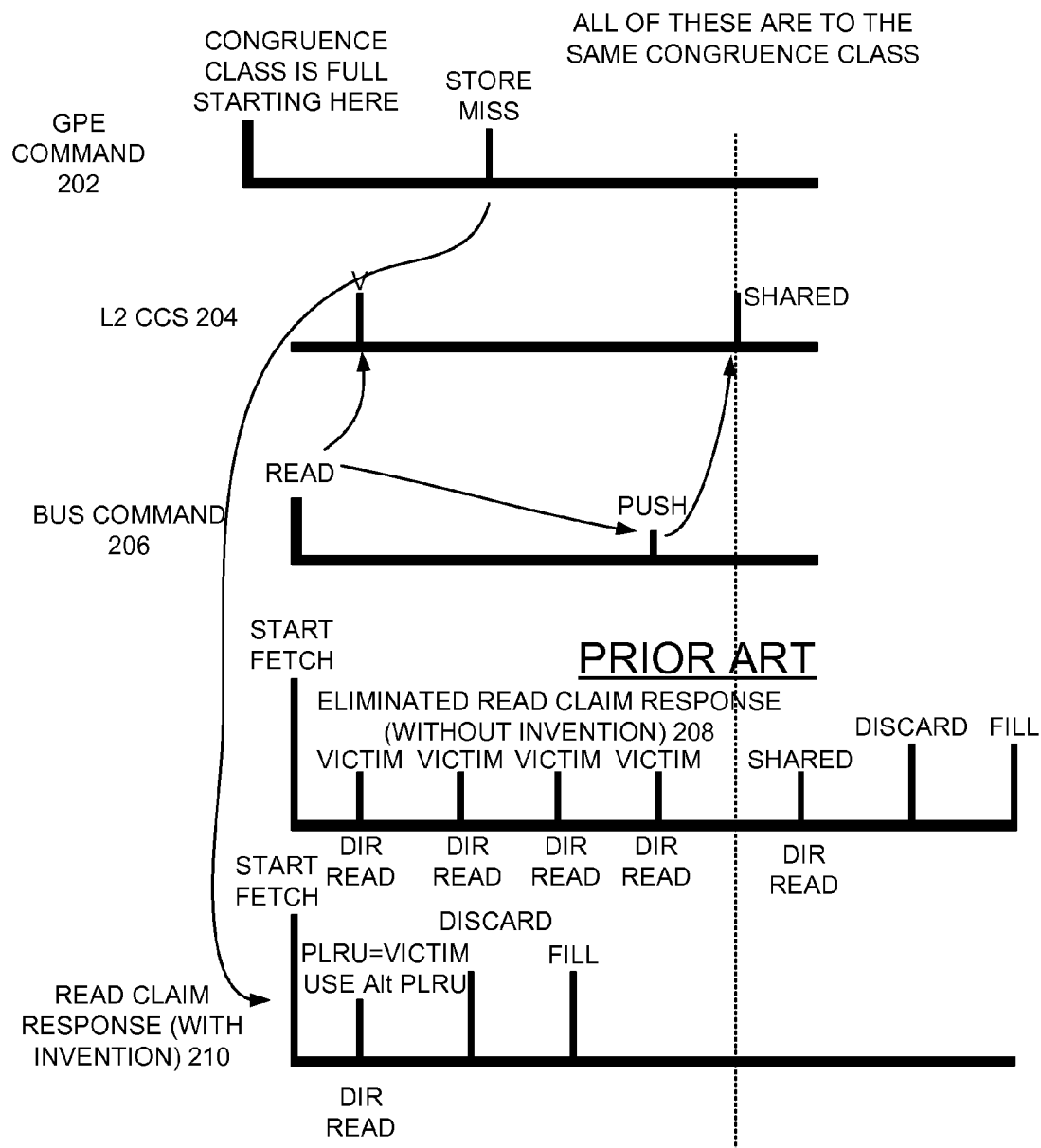

FIGS. 2A and 2B are diagrams respectively illustrating performance problems of conventional cache coherency operations and improved performance of cache coherency operations in accordance with the preferred embodiment. In both FIGS. 2A and 2B, all illustrated operations are to the same congruence class.

Referring to FIG. 2A, the prior art cache coherency operations are shown. During a fetch for a cache miss, the read claim unit reads the directory entry for the congruence class, derived from the address of the command. If all ways of the congruence class are valid then a cache line needs to be picked for replacement or aged out. The example of FIG. 2A shows a store command from the GPE that gets a cache miss as indicated at a line 202 after the congruence class is full and shortly after a read command as indicated at a line 206 from another bus unit has changed a cache line to the victim state preparatory to a push. The read hits an exclusive state as indicated at line 204, and is to the same cache line as the replacement for the store miss. The store miss is the new cache line in the same congruence class. When the cache line picked for replacement is in the victim state then read claim has to wait until the owner of the cache line releases it from the victim state before continuing with the fetch. Read claim is then required to intermittently poll the directory for the current status of the cache line. This causes unnecessary read traffic to the directory, which already has 5 other readers competing for read access. It also causes an unnecessary delay of the GPE for commands behind the first miss that get a second miss, and can also stall the GPE as a result for no good reason. The faster that a miss in read claim can be handled the shorter the window of opportunity that a second miss in stage 1 of the pipeline backpressures the GPE.

As shown, the store command at line 202 is to the same congruence class and prompts the need for a replacement, either castout or discard. Prior to the store miss command the congruence class was full and therefore the store miss requires a castout or discard to make room for the new cache line. Unfortunately the cache line that is calculated as the pseudo least recently used (PLRU) is the same cache line that was attacked by the read and marked victim as indicated at a line 208. Since read claim cannot replace a cache line that is in victim state, the read claim has to wait until the owner of the cache line, the snoop engine because of the read, takes the cache line out of the victim state. The only way that read claim could tell if the cache line has been taken out of victim is to poll the directory intermittently, as indicated by the four directory reads (DIR READ) at line 208. This polling the directory causes unnecessary load on the directory, and can also stall the GPE for no good reason. When read claim finally reads a non-victim CCS at line 208, read claim sees that the CCS is now shared and read claim can now complete the replacement and fill. In this case the replacement is a discard and fill, since the cache line to be replaced is shared, and therefore exists in memory, and does not need a castout. If the cache line were modified or tagged, then a castout would be required.

Referring to FIG. 2B, the improved performance of cache coherency operations in accordance with the preferred embodiment is shown for comparison with the prior art cache coherency operations at line 208 that are eliminated by the invention. As indicated at a line 210, the read claim unit uses an alternate PLRU that is picked when the read claim engine identifies a PLRU cache line for replacement and the PLRU cache line is in a victim cache coherency state. Using the alternate PLRU enables the read claim to complete the discard and fill, eliminating the polling of the directory required by the prior art.

Figure 3:
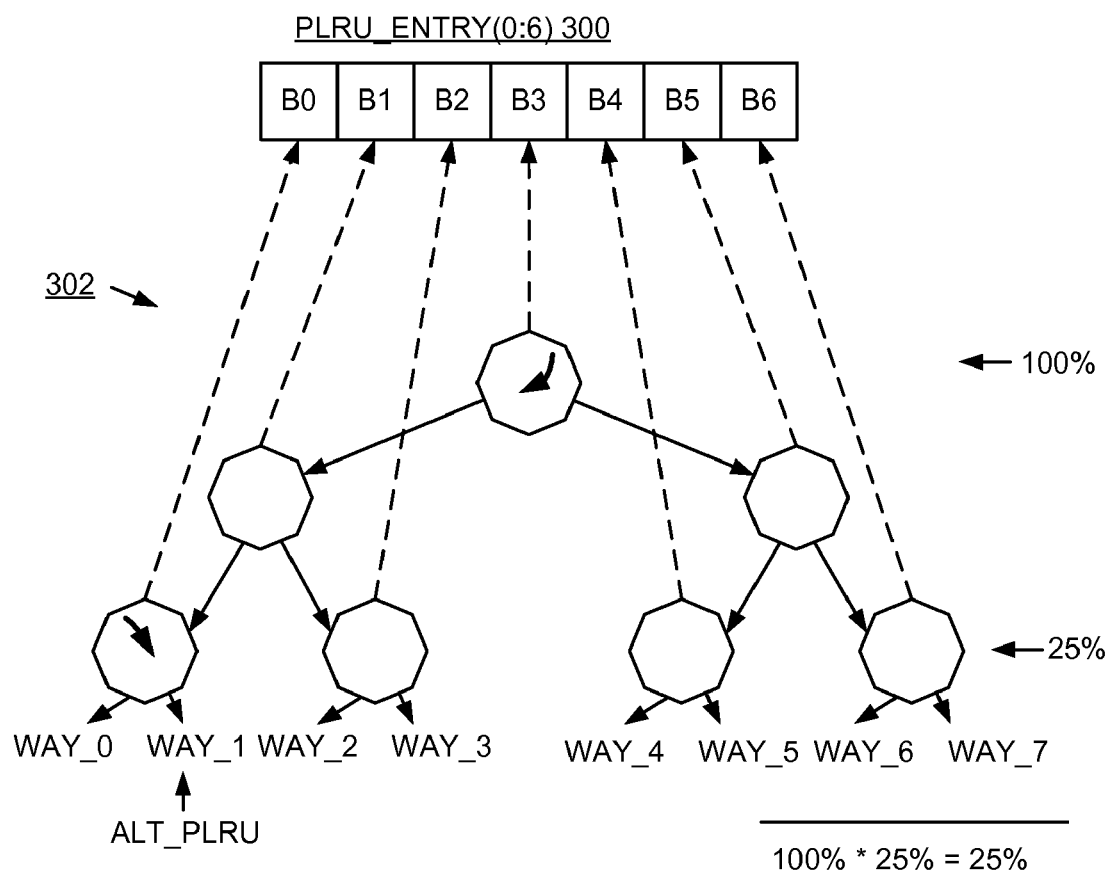
FIGS. 3, 4, and 5 are diagrams illustrating exemplary binary tree probabilities for implementing cache coherency with an alternate pseudo least recently used (PLRU) algorithm in accordance with the preferred embodiment.
Figure 4:
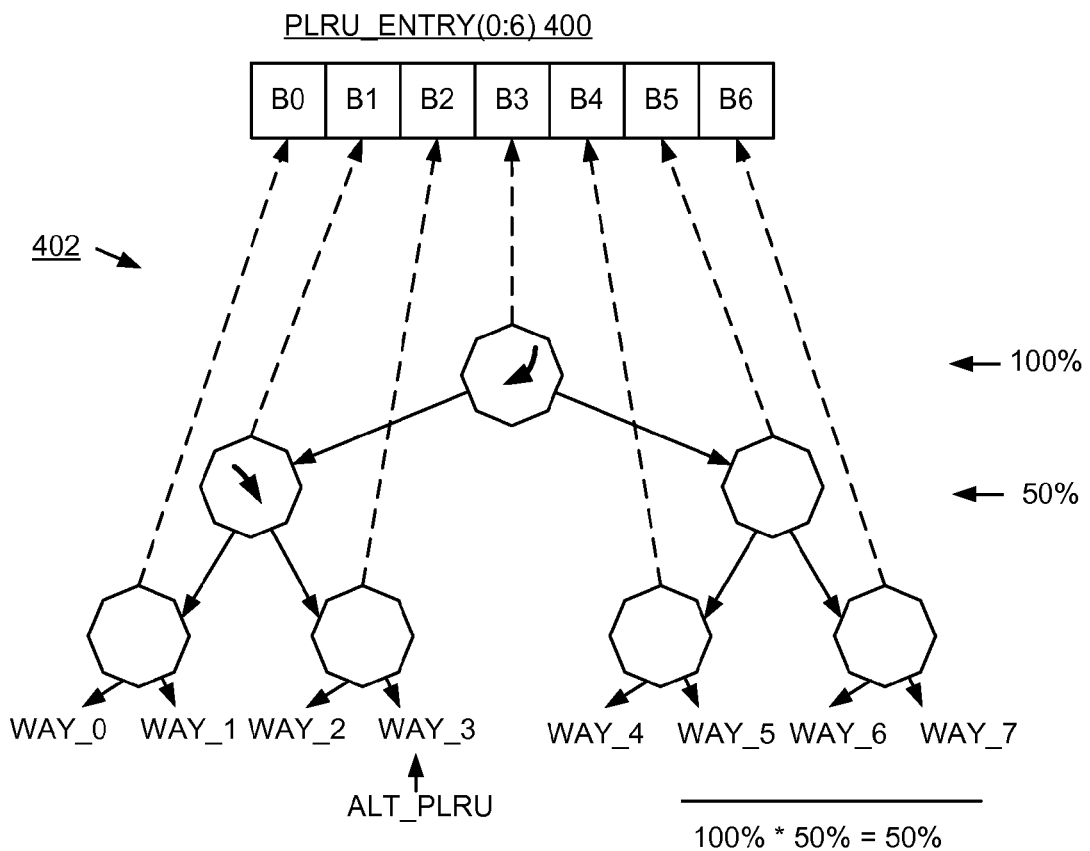
Figure 5:
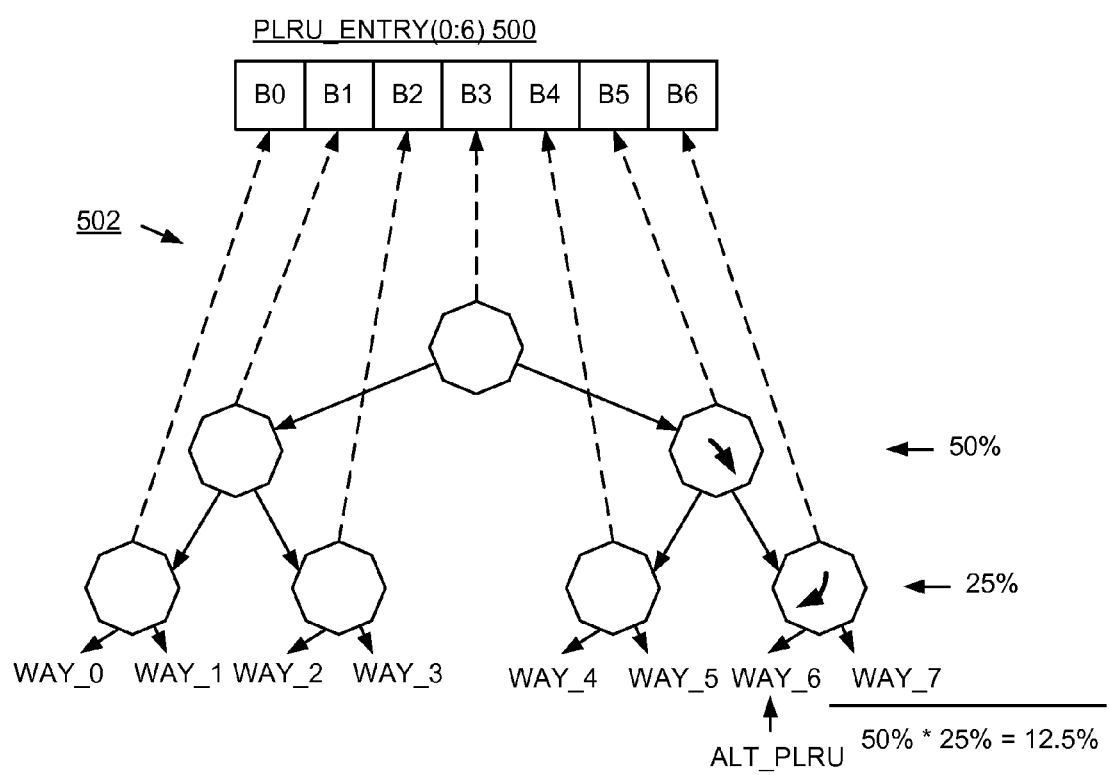

Referring now to FIGS. 3, 4, and 5 there are shown exemplary binary tree probabilities for implementing cache coherency with an alternate pseudo least recently used (PLRU) algorithm in accordance with the preferred embodiment. In FIGS. 3, 4, and 5, a respective PLRU entry (0:6) 300, 400, 500 includes bits B0, B1, B2, B3, B4, B5, B6, and a respective binary tree 302, 402, 502.

In accordance with features of the invention, an alternate PLRU is formed by first calculating the current PLRU or PLRU entry (0:6) 300, 400, 500 and picking a next best sibling in the binary tree 302, 402, 502, by picking the sibling with the next most arrows pointing to it. In the case of a 7 bit binary tree for an 8 way L2 cache as shown in FIGS. 3, 4, and 5, there will be 3 next-best siblings to choose from. The choice of the next best sibling is based on the probability that the next hit will change the desirability of the way as the next best PLRU. This works because the binary tree is only updated on cache hits and when a cache hit occurs the only certain bits of the binary tree are updated to specific values based on the way for that cache hit. As shown, a '0' in the node of a tree 302, 402, 502, says "point left", and a '1' in the node of a tree says "point right".

The choice for an alternate PLRU is always be from a set of 3 for an 8 way L2 cache, which does not include the LRU or MRU. The alternatives for an alternate PLRU are determined by the number of arrows that are pointing to it. The higher the number of arrows, the better the choice is for an APLRU. The arrow count ranges from 3 arrows for the LRU, to 0 arrows for the MRU. The APLRU is chosen from the list that have 2 arrows with an 8 way associative cache this is a set of 3.

Since the set from which the alternate PLRU should be picked is known, we now have to determine if there is an optimum. In an environment that has totally random hit patterns the choice between the set 3 does not matter. In other words it does not matter which one alternate PLRU is pick because each of the set has an equal chance of being the right one. So the random hit pattern indicates nothing about the optimal choice. The optimal choice is determined looking at the worst case access pattern, which is defined as the access pattern that causes the highest frequency of bit changes in the binary tree. The reason this is the worst case is because it has a higher probability of changing the number of arrows pointing at the alternate PLRU on the next cache hit. The optimal choice is to pick an alternate PLRU that has the highest chance of still having at least 2 arrows pointing at it after the next cache hit.

The following examples show the bits that change on a cache hit and the value that is used in the update. A '-' means that the bit retains its previous value. Based on the bit updates, the worst case probability that a bit will change can be calculated. For example, bit 3 or B3 of PLRU entry (0:6) 300, 400, 500 including bits B0, B1, B2, B3, B4, B5, B6 is written every time there is a cache hit. Bit 3 is the highest node in each tree 302, 402, 502.

Hit/Update way__0=Write (1, 1, -, 1, -, -, -)
Hit/Update way__1=Write (0, 1, -, 1, -, -, -)
Hit/Update way__2=Write (-, 0, 1, 1, -, -, -)
Hit/Update way__3=Write (-, 0, 0, 1, -, -, -)
Hit/Update way__4=Write (-, -, -, 0, 1, 1, -)
Hit/Update way__5=Write (-, -, -, 0, 0, 1, -)
Hit/Update way__6=Write (-, -, -, 0, -, 0, 1)
Hit/Update way__7=Write (-, -, -, 0, -, 0, 0)

Nominal and best case probabilities have been added in FIGS. 3, 4, and 5 to show that the solution is consistent across the spectrum. It can be inferred from the following examples that if the solution is applicable to the worst case and the best case that the solution holds true for all cases in between. Therefore the focus of the analysis is on the worst case since the best case solution is trivial because no bits in the PLRU have changed and therefore the alternate PLRU value has not changed. The nominal case is interpolated between best and worst case by 50%.

Example 1

Best Case (lowest) Probability of a bit being changed on the next cache hit. (Example Hit Pattern=44444444)

| Bit | Prob | Node Level |
|-----|------|------------|
| 0 | 0% | 0 |
| 1 | 0% | 1 |
| 2 | 0% | 0 |
| 3 | 0% | 2 |
| 4 | 0% | 0 |
| 5 | 0% | 1 |
| 6 | 0% | 0 |

Example 2

Nominal (middle) Probability of a bit being changed on the next cache hit. (Example Hit Pattern=Random)

| Bit | Prob | Node Level |
|-----|------|------------|
| 0 | 12.5% | 0 |
| 1 | 25% | 1 |
| 2 | 12.5% | 0 |
| 3 | 50% | 2 |
| 4 | 12.5% | 0 |
| 5 | 25% | 1 |
| 6 | 12.5% | 0 |

Example 3

Worst Case (highest) Probability of a bit being changes on the next cache hit. (Example Hit Pattern=04261537)

| Bit | Prob | Node Level |
|-----|------|------------|
| 0 | 25% | 0 |
| 1 | 50% | 1 |
| 2 | 25% | 0 |
| 3 | 100% | 2 |
| 4 | 25% | 0 |
| 5 | 50% | 1 |
| 6 | 25% | 0 |

FIGS. 3, 4, and 5 show the worst case probabilities for each of the 3 alternatives for an alternate PLRU. By treating each bit change as an independent flip the probabilities of the two bits in question are combined to give an overall probability of change to the option. The lower the overall probability the better the choice is for an alternate PLRU.

As shown, probability of being taken off the alternate PLRU candidate list on next hit in FIG. 3 equals 100%*25%=25%, in FIG. 4 equals 100%*50%=50% and in FIG. 5 equals 50%*25%=12.5% FIG. 5 illustrates the lowest probability of switching on the next hit and is the Best Option.

Figure 6:
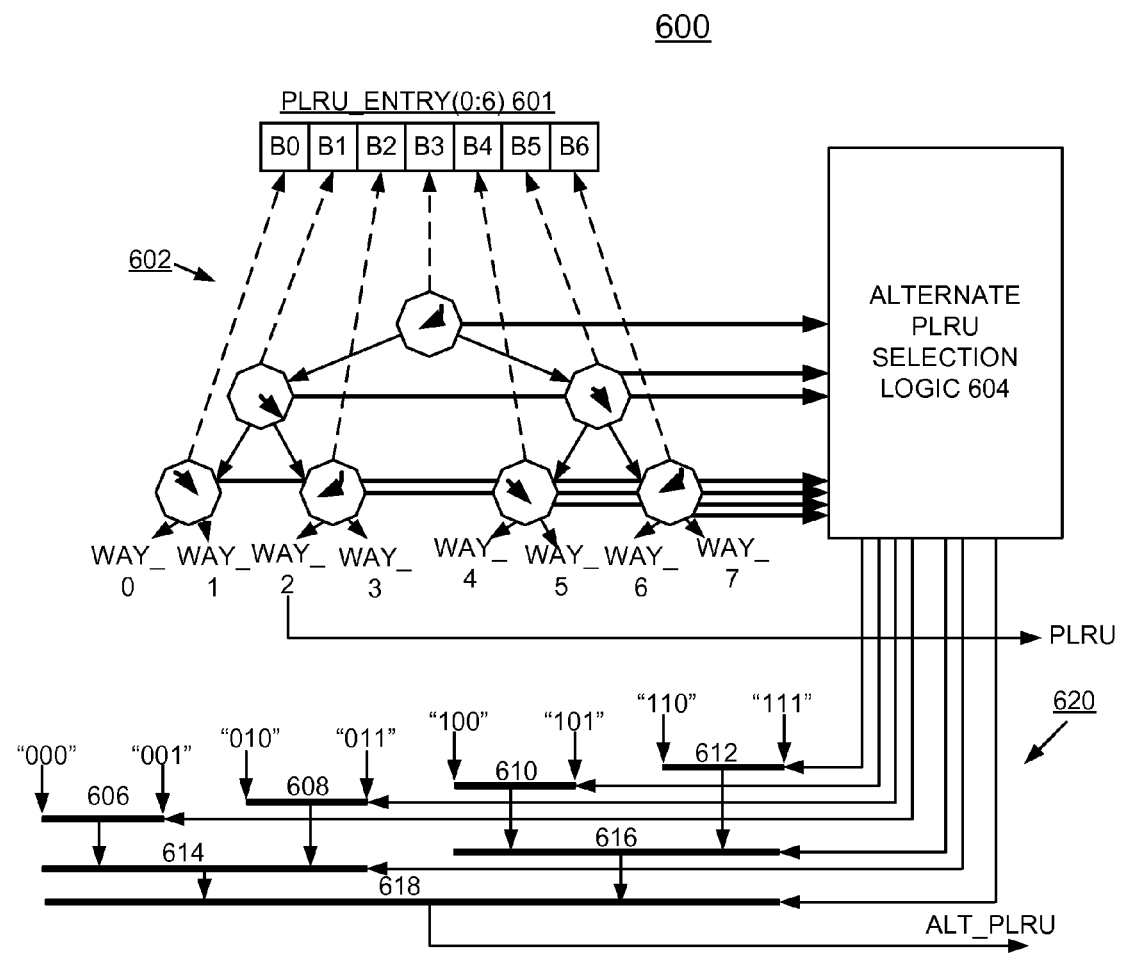
FIG. 6 is a schematic diagram illustrating an exemplary cache coherency control circuit for implementing cache coherency with an alternate pseudo least recently used (PLRU) algorithm in accordance with the preferred embodiment.

FIG. 6 illustrates an exemplary cache control circuit generally designated by reference character 600 for replacing cache lines using the alternate pseudo least recently used (PLRU) algorithm in accordance with the preferred embodiment. Cache control circuit 600 includes a PLRU entry (0:6) 601 including bits B0, B1, B2, B3, B4, B5, B6, a binary tree 602 for an 8 way L2 cache coupled to an alternate PLRU selection logic 604 in accordance with the preferred embodiment. The alternate PLRU selection logic 604 provides a selection input to each of a plurality of two way multiplexers 606, 608, 610, 612, 614, 618 defining a multiplexer decision pipe generally designated by reference character 620 providing the alternate PLRU output indicated as ALT_PLRU. The alternate PLRU selection logic 604 and multiplexer decision pipe 620 is represented by the following selection pseudocode.

```
ALT_PLRU <=
    way_0 when ((LRU/=way_0) and (B0='0') and (B1='0')) else
    way_1 when ((LRU/=way_1) and (B0='1') and (B1='0')) else
    way_2 when ((LRU/=way_2) and (B2='0') and (B1='1')) else
    way_3 when ((LRU/=way_3) and (B2='1') and (B1='1')) else
    way_4 when ((LRU/=way_4) and (B4='0') and (B5='0')) else
    way_5 when ((LRU/=way_5) and (B4='1') and (B5='0')) else
    way_6 when ((LRU/=way_6) and (B6='0') and (B5='1')) else
    way_7 when ((LRU/=way_7) and (B6='1') and (B5='1'));
```

Figure 7:
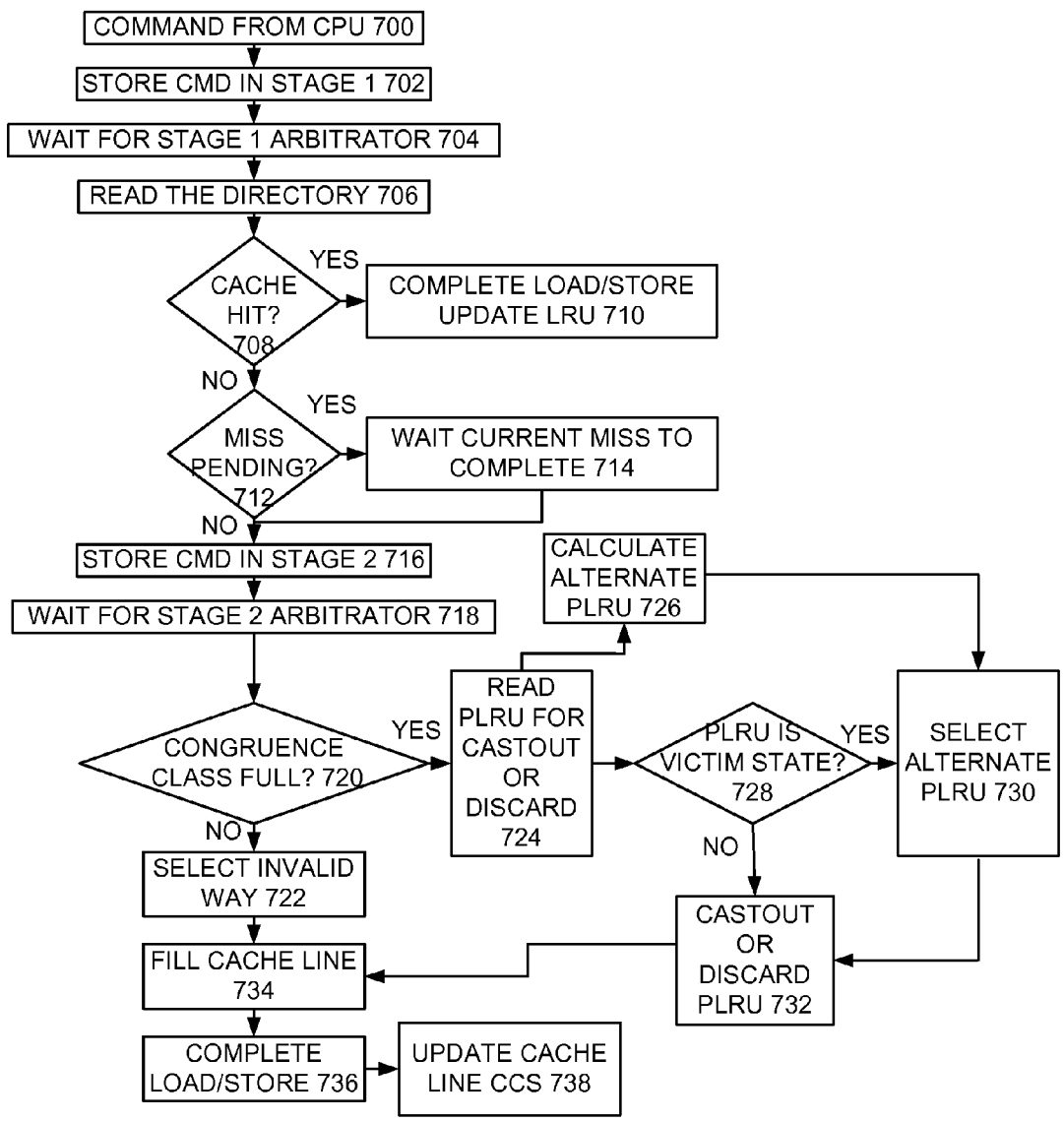
FIG. 7 is a flow chart illustrating exemplary cache coherency control operations for implementing cache coherency with an alternate pseudo least recently used (PLRU) algorithm in accordance with the preferred embodiment.

Referring to FIG. 7, there are shown exemplary cache control operations for replacing cache lines with an alternate least recently used (PLRU) algorithm in accordance with the preferred embodiment. A command is received from the CPU as indicated at a block 700. The command is stored in Stage 1 as indicated at a block 702 and waiting for the stage 1 arbitrator as indicated at a block 704. The directory is read as indicated at a block 706.

Checking for a cache hit is performed as indicated at a decision block 708. When a cache hit results, a load/store for the command is completed and the LRU is updated as indicated at a block 710. Otherwise when a cache miss results, checking for a pending cache miss is performed as indicated at a decision block 712.

When a pending cache miss is identified, then waiting for the current cache miss to complete is provided as indicated at a block 714 with only one cache miss being handled at a time. Then and when a pending cache miss is not identified, the command is stored in Stage 2 as indicated at a block 716 and waiting for the stage 2 arbitrator as indicated at a block 718.

Checking for a full congruence class, or if all ways of the congruence class are valid, is performed as indicated at a decision block 720. When the congruence class is not full, then an invalid way is selected as indicated at a block 722. When the congruence class is full, then the PLRU is read for castout or discard as indicated at a block 724. An alternate PLRU is calculated as indicated at a block 726. Checking for the PLRU is in the victim cache coherency state is performed as indicated at a decision block 728. If the PLRU is in the victim cache coherency state, then the alternate PLRU is selected as indicated at a block 730, and castout or discarded as indicated at a block 732. Otherwise, if the PLRU is not in the victim cache coherency state, then the PLRU is castout or discarded at block 732.

After castout or discard at block 732, or after an invalid way is selected at block 722, then the cache line is filled as indicated at a block 734, the load/store completed as indicated at a block 736, and the cache line cache coherency state (CCS) is updated as indicated at a block 738.

Figure 8:
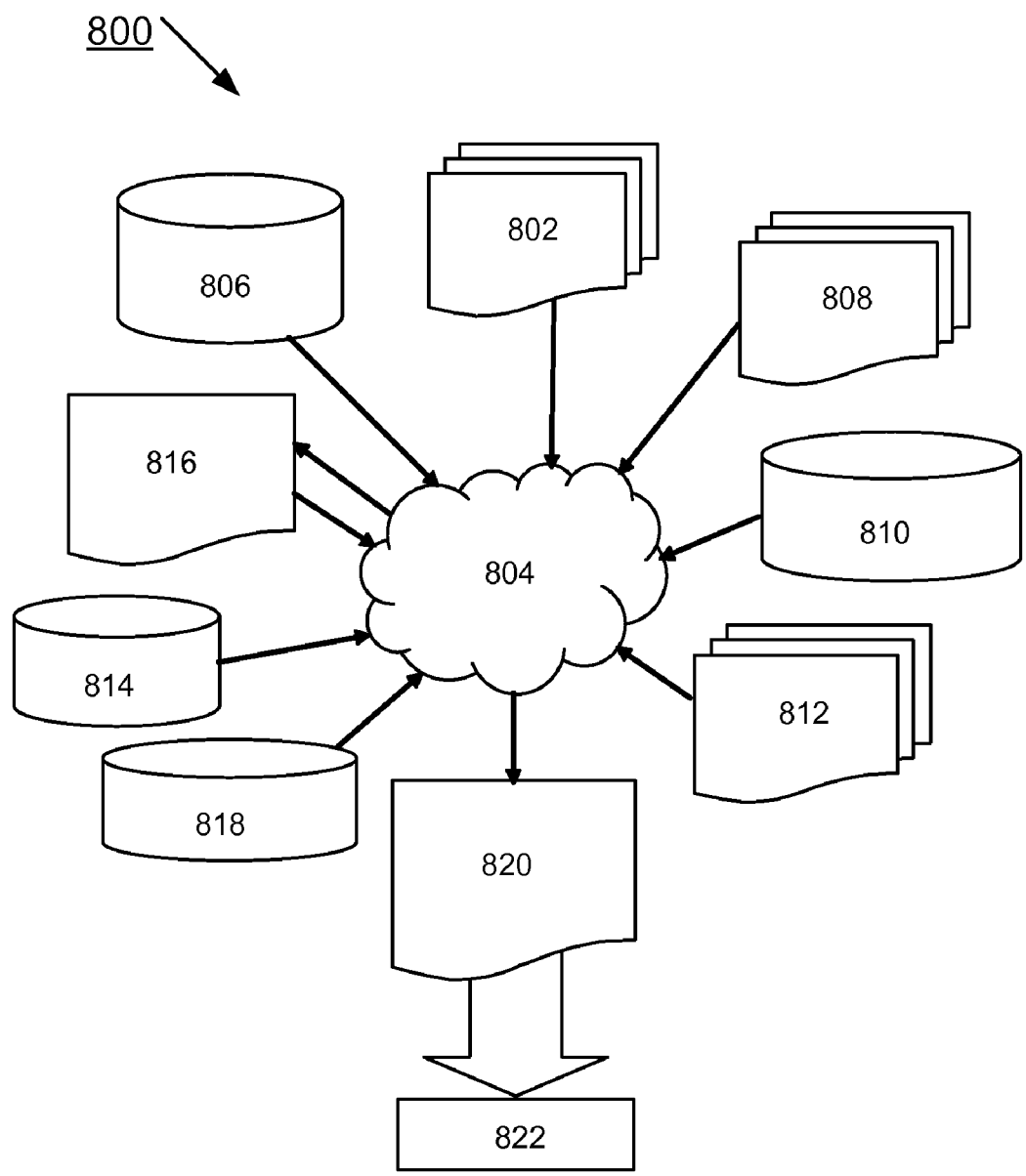
FIG. 8 is a flow diagram of a design process used in semiconductor design, manufacturing, and/or test.

FIG. 8 shows a block diagram of an example design flow 800. Design flow 800 may vary depending on the type of IC being designed. For example, a design flow 800 for building an application specific IC (ASIC) may differ from a design flow 800 for designing a standard component. Design structure 802 is preferably an input to a design process 804 and may come from an IP provider, a core developer, or other design company or may be generated by the operator of the design flow, or from other sources. Design structure 802 comprises computer system 100 and circuit 700 in the form of schematics or HDL, a hardware-description language, for example, Verilog, VHDL, C, and the like. Design structure 802 may be contained on one or more machine readable medium. For example, design structure 802 may be a text file or a graphical representation of computer system 100 and circuit 700. Design process 804 preferably synthesizes, or translates, circuit 100 into a netlist 806, where netlist 806 is, for example, a list of wires, transistors, logic gates, control circuits, I/O, models, etc. that describes the connections to other elements and circuits in an integrated circuit design and recorded on at least one of machine readable medium. This may be an iterative process in which netlist 806 is resynthesized one or more times depending on design specifications and parameters for the computer system 100 and circuit 600.

Design process 804 may include using a variety of inputs; for example, inputs from library elements 808 which may house a set of commonly used elements, circuits, and devices, including models, layouts, and symbolic representations, for a given manufacturing technology, such as different technology nodes, 32 nm, 45 nm, 90 nm, and the like, design specifications 810, characterization data 812, verification data 814, design rules 816, and test data files 818, which may include test patterns and other testing information. Design process 804 may further include, for example, standard circuit design processes such as timing analysis, verification, design rule checking, place and route operations, and the like. One of ordinary skill in the art of integrated circuit design can appreciate the extent of possible electronic design automation tools and applications used in design process 804 without deviating from the scope and spirit of the invention. The design structure of the invention is not limited to any specific design flow.

Design process 804 preferably translates an embodiment of the invention as shown in FIGS. 1 and 6 along with any additional integrated circuit design or data (if applicable), into a second design structure 820. Design structure 820 resides on a storage medium in a data format used for the exchange of layout data of integrated circuits, for example, information stored in a GDSII (GDS2), GL1, OASIS, or any other suitable format for storing such design structures. Design structure 820 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1 and 6. Design structure 820 may then proceed to a stage 822 where, for example, design structure 820: proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for replacing a cache line comprising the steps of:
   identifying a requirement for replacement in a congruence class;
   calculating a first pseudo least recently used (PLRU) cache line for replacement in the congruence class;
   calculating an alternate pseudo least recently used (PLRU) cache line for replacement in the congruence class;
   checking for said calculated first PLRU cache line being in a victim cache coherency state; said victim cache coherency state being used to manage a cache line currently in use by a read claim engine or a snoop engine;
   selecting said calculated alternate PLRU cache line for replacement responsive to identifying said calculated first PLRU cache line being in the victim cache coherency state;
   providing a binary tree representing a current pseudo least recently used (PLRU) cache line and each of a plurality of ways of associativity for the shared cache including 8 ways of associativity for the shared cache represented by way 0, way 1, way 2, way 3, way 4, way 5, way 6, way 7; and wherein the current PLRU cache line is represented by 7 bits including B0, B1, B2, B3, B4, B5, B6;
   providing selection pseudo-code including

---

ALT_PLRU <=
  way_0 when ((LRU/=way_0) and (B0='0') and (B1='0')) else
  way_1 when ((LRU/=way_1) and (B0='1') and (B1='0')) else
  way_2 when ((LRU/=way_2) and (B2='0') and (B1='1')) else
  way_3 when ((LRU/=way_3) and (B2='1') and (B1='1')) else
  way_4 when ((LRU/=way_4) and (B4='0') and (B5='0')) else
  way_5 when ((LRU/=way_5) and (B4='1') and (B5='0')) else
  way_6 when ((LRU/=way_6) and (B6='0') and (B5='1')) else
  way_7 when ((LRU/=way_7) and (B6='1') and (B5='1')).

--- where each of said respective 8 ways 0-7 of associativity for the shared cache is represented by way_n, and the respective terms (LRU/=way_n) defines a multiplexer decision pipe receiving respective current PLRU cache line bits B0, B1, B2, B3, B4, B5, B6 providing the alternate PLRU output represented by ALT_PLRU.

2. The method of claim 1 includes identifying a cache hit and updating a pseudo least recently used (PLRU) cache line for replacement.

3. The method of claim 1 wherein calculating a first PLRU cache line for replacement includes identifying a current pseudo least recently used (PLRU) cache line for replacement.

4. The method of claim 3 wherein calculating an alternate PLRU cache line includes identifying a next best PLRU cache line for replacement.

5. The method of claim 1 includes replacement of said calculated first PLRU cache line and said calculated alternate PLRU (APLRU) cache line.

6. The method of claim 5 further includes filling said cache line, completing a load/store operation, and updating a cache line coherency state.

7. A cache control circuit for replacing a cache line in a shared cache using an alternate pseudo least recently used (PLRU) algorithm with a victim cache coherency state comprising:
   a directory storing cache coherency states for cache lines in the shared cache;
   a pseudo least recently used (PLRU) cache line identified for replacement responsive to a cache miss and a full congruence class of the cache miss;
   alternate PLRU selection logic for calculating an alternate PLRU cache line for replacement;
   a read claim unit checking said directory for said PLRU cache line identified for replacement being in said victim cache coherency state; said victim cache coherency state being used to manage a cache line currently in use by a read claim engine or a snoop engine;
   said read claim unit selecting said calculated alternate PLRU for replacement responsive to identifying said PLRU cache line being in the victim cache coherency state;
   said alternate PLRU selection logic including a binary tree representing a current pseudo least recently used (PLRU) cache line and each of a plurality of ways of associativity for the shared cache; and including 8 ways of associativity for the shared cache represented by way 0, way 1, way 2, way 3, way 4, way 5, way 6, way 7; and wherein the current PLRU cache line is represented by 7 bits including B0, B1, B2, B3, B4, B5, B6;
   said alternate PLRU selection logic being represented by selection pseudo-code including

---

ALT_PLRU <=
  way_0 when ((LRU/=way_0) and (B0='0') and (B1='0')) else
  way_1 when ((LRU/=way_1) and (B0='1') and (B1='0')) else
  way_2 when ((LRU/=way_2) and (B2='0') and (B1='1')) else
  way_3 when ((LRU/=way_3) and (B2='1') and (B1='1')) else
  way_4 when ((LRU/=way_4) and (B4='0') and (B5='0')) else
  way_5 when ((LRU/=way_5) and (B4='1') and (B5='0')) else
  way_6 when ((LRU/=way_6) and (B6='0') and (B5='1')) else
  way_7 when ((LRU/=way_7) and (B6='1') and (B5='1'))

--- where each of said respective 8 ways 0-7 of associativity for the shared cache is represented by way_n, and the respective terms (LRU/=way_n) defines a multiplexer decision pipe receiving respective current PLRU cache line bits B0, B1, B2, B3, B4, B5, B6 providing the alternate PLRU output represented by ALT_PLRU.

8. The cache control circuit of claim 7 includes a hitmiss unit updating a pseudo least recently used (PLRU) cache line for replacement responsive to a cache hit.

9. The cache control circuit of claim 7 wherein said PLRU selection logic is responsive to a cache miss for calculating the cache line for replacement.

10. The cache control circuit of claim 7 wherein said alternate PLRU selection logic identifies a next best PLRU cache line for replacement.

11. The cache control circuit of claim 7 wherein said alternate LRU selection logic uses the current PLRU cache line for replacement and selects a next best sibling in the binary tree for the current PLRU cache line based on the probability of a next cache hit changing the next best sibling.

12. The cache control circuit of claim 7 wherein said alternate PLRU selection logic includes a plurality of two way multiplexers defining a multiplexer decision pipe; said multiplexer decision pipe providing an output of said alternate PLRU.

13. A design structure embodied in a machine readable medium used in a design process, the design structure comprising:
   a cache control circuit including;
   a directory storing cache coherency states for cache lines in the shared cache;
   a pseudo least recently used (PLRU) cache line identified for replacement responsive to a cache miss and a full congruence class of the cache miss;
   alternate PLRU selection logic for calculating an alternate PLRU (APLRU) cache line for replacement;
   a read claim unit checking said directory for said PLRU cache line identified for replacement being in a victim cache coherency state; said victim cache coherency state being used to manage a cache line currently in use by a read claim engine or a snoop engine;
   said read claim unit selecting said calculated alternate PLRU (APLRU) for replacement responsive to identifying said LRU cache line being in the victim cache coherency state;
      said alternate PLRU selection logic including a binary tree representing a current pseudo least recently used (PLRU) cache line and each of a plurality of ways of associativity for the shared cache; and including 8 ways of associativity for the shared cache represented by way 0, way 1, way 2, way 3, way 4, way 5, way 6, way 7; and wherein the current PLRU cache line is represented by 7 bits including B0, B1, B2, B3, B4, B5, B6;
   said alternate PLRU selection logic being represented by selection pseudo-code including

```
ALT PLRU <=
  way_0 when ((LRU/=way_0) and (B0='0') and (B1='0')) else
  way_1 when ((LRU/=way_1) and (B0='1') and (B1='0')) else
  way_2 when ((LRU/=way_2) and (B2='0') and (B1='1')) else
  way_3 when ((LRU/=way_3) and (B2='1') and (B1='1')) else
  way_4 when ((LRU/=way_4) and (B4='0') and (B5='0')) else
  way_5 when ((LRU/=way_5) and (B4='1') and (B5='0')) else
  way_6 when ((LRU/=way_6) and (B6='0') and (B5='1')) else
  way_7 when ((LRU/=way_7) and (B6='1') and (B5='1'))
``` where each of said respective 8 ways 0-7 of associativity for the shared cache is represented by way_n, and the respective terms (LRU/=way_n) defines a multiplexer decision pipe receiving respective current PLRU cache line bits B0, B1, B2, B3, B4, B5, B6 providing the alternate PLRU output represented by ALT_PLRU.

14. The design structure of claim 13, wherein the design structure comprises a netlist, which describes the circuit.

15. The design structure of claim 13, wherein the design structure resides on storage medium as a data format used for the exchange of layout data of integrated circuits.

16. The design structure of claim 13, wherein the design structure includes at least one of test data files, characterization data, verification data, or design specifications.

* * * * *